M. D. NICHOLSON.
OVEN TURN TABLE.
APPLICATION FILED OCT. 5, 1909.
955,095.
Patented Apr. 12, 1910.
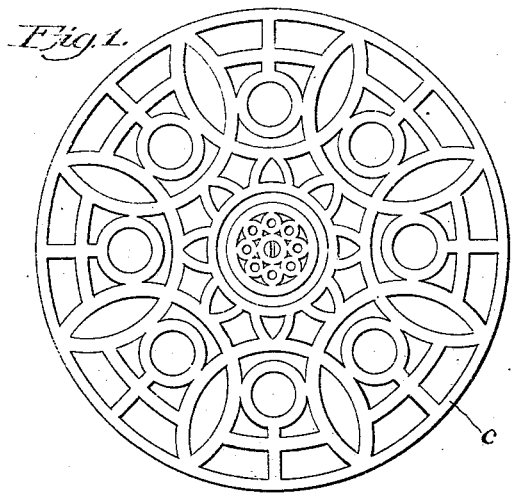
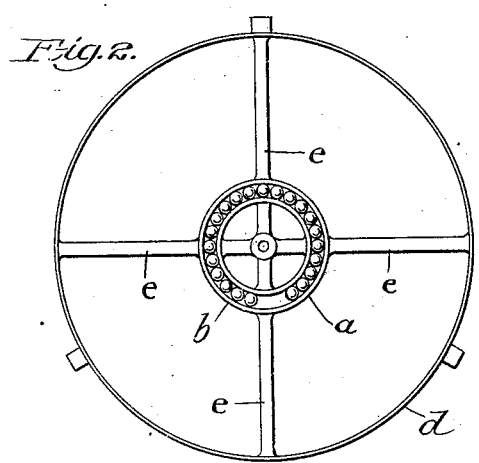
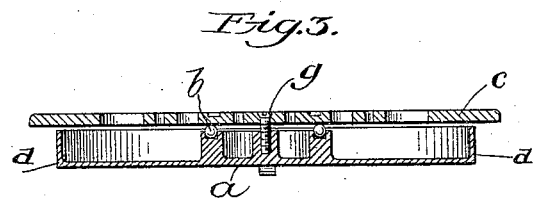
INVENTOR
WITNESSES
ATTORNEY

UNITED STATES PATENT OFFICE.

MARCUS D. NICHOLSON, OF PHILADELPHIA, PENNSYLVANIA, ASSIGNOR OF ONE-HALF TO JAMES G. MOUNT, OF PHILADELPHIA, PENNSYLVANIA.

OVEN TURN-TABLE.

955,095. Specification of Letters Patent. Patented Apr. 12, 1910.

Application filed October 5, 1909. Serial No. 521,138.

*To all whom it may concern:*

Be it known that I, MARCUS D. NICHOLSON, a citizen of the United States, and a resident of the city and county of Philadelphia, State of Pennsylvania, have invented certain new and useful Improvements in Oven Turn-Tables, of which the following is a specification.

My invention relates to improvements in oven turn-tables, that is, rotatable devices for carrying the pan or pans upon which an article or articles to be baked, as pies, puddings, bread, meat &c., is placed and which can be revolved so as to bring any particular pan and its contents to the front of the oven for inspection, basting, &c., or to conveniently move a pan from one part of the oven to another without having to lift it by hand.

My invention is an improvement upon the device shown in the patent issued to Egbert L. Maranville, March 13, 1883, No. 274,009, the object being to furnish a means for bringing the heat rising from the bottom of the oven into more complete contact with the article being baked than is possible with the form of device shown in this patent.

In the accompanying drawings forming part of this specification and in which similar letters of reference indicate similar parts throughout the several views:—Figure 1, is a plan of the perforated rotatable top of my improved turn-table; Fig. 2, a plan of the base of the turntable; Fig. 3, a side elevation, partly in section, of the assembled device.

My invention consists of a base $a$ carrying a runway for balls $b$, a revoluble top $c$ carried by the balls $b$ and of a heat-band $d$.

The base $a$, the balls $b$ and the revolving top of my turn-table are substantially similar to those shown in the invention above referred to and will not need detailed description here as this invention has to do, primarily, with the heat-band, the purpose of which is to cause the heat beneath the turn-table to pass up through the turn-table to accelerate the baking of articles carried upon it.

The heat-band $d$, shown in Figs. 2 and 3, is carried by arms $e$ which radiate from the base $a$. This heat-band is shown as a solid ring of metal the bottom of which is adapted to rest upon the oven bottom and the top of which extends almost up to the bottom of the revoluble top $c$.

$g$ is a screw or bolt which secures the top $c$ to the base $a$.

The device is comparatively light in weight and can be instantly removed from or placed in the oven, or it can be, obviously, permanently attached to and made part of the oven if desired.

Having thus described my invention I claim as new and desire to secure by Letters Patent:

The combination in an oven turn-table of a revoluble top, a central base having a circular runway for balls, balls carried in said runway for carrying said top, arms extending out from the lower part of said base, and a heat band carried by said arms, said band surrounding said base and reaching almost to the under side of said revoluble top.

MARCUS D. NICHOLSON.

Witnesses:
GEO. H. HILL, Jr.,
CHARLES A. RUTTER.